United States Patent [19]

Knaell et al.

[11] Patent Number: 5,394,151
[45] Date of Patent: Feb. 28, 1995

[54] APPARATUS AND METHOD FOR PRODUCING THREE-DIMENSIONAL IMAGES

[75] Inventors: Kenneth K. Knaell, Kensington, Md.; Glen R. Heidbreder, Reston, Va.

[73] Assignee: The United States of America as represented by the Secretary of the Navy, Washington, D.C.

[21] Appl. No.: 129,499

[22] Filed: Sep. 30, 1993

[51] Int. Cl.⁶ .............................................. G01S 13/90
[52] U.S. Cl. .................................................. 342/25
[58] Field of Search ......................................... 342/25

[56] References Cited

U.S. PATENT DOCUMENTS

| | | | |
|---|---|---|---|
| 4,847,624 | 7/1989 | Hopwood et al. | 342/25 X |
| 4,975,704 | 12/1990 | Gabriel et al. | 342/25 |
| 5,053,778 | 10/1991 | Imhoff | 342/25 |
| 5,260,708 | 11/1993 | Auterman | 342/25 |

Primary Examiner—Gilberto Barrón, Jr.
Attorney, Agent, or Firm—Charles D. Miller

[57] ABSTRACT

An apparatus and method is capable of acquiring useful three-dimensional radar images from an aircraft which travels in a curvilinear path to generate only a sparsely filled synthetic array. A motion measurement unit outputs position measurements as the aircraft travels in the curvilinear path. The system includes a motion compensation and timing unit and a wave transmitter which outputs chirped radar signals. An antenna coupled to the wave generator sends the chirped radar signals to a region to be imaged and receives scattered chirped radar return signals from scatterers in the region. These scattered signals are coherently mixed to baseband and digitized before being input to a processor. The processor includes a range processing unit, a memory unit and an estimator. The range processor receives and Fourier transforms the digitized return signals to obtain range profiles. The estimator completes the image formation process by three-dimensional back projection of the range profiles. It also estimates the location and complex strengths of scatterers and uses these to generate a side lobe free image.

3 Claims, 6 Drawing Sheets

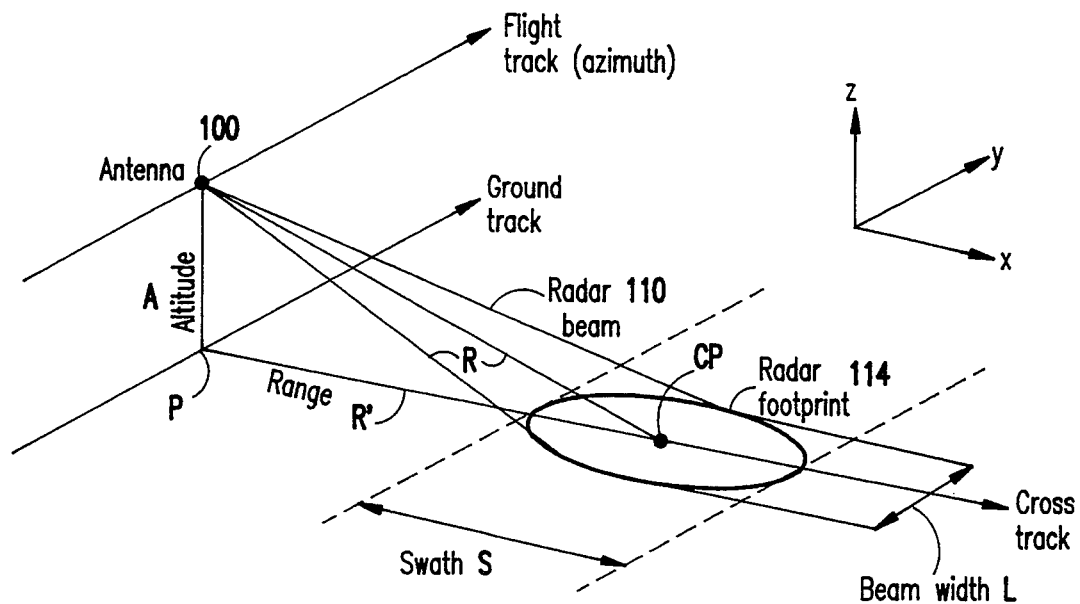
FIG.2 Basic geometry of synthetic aperture radar

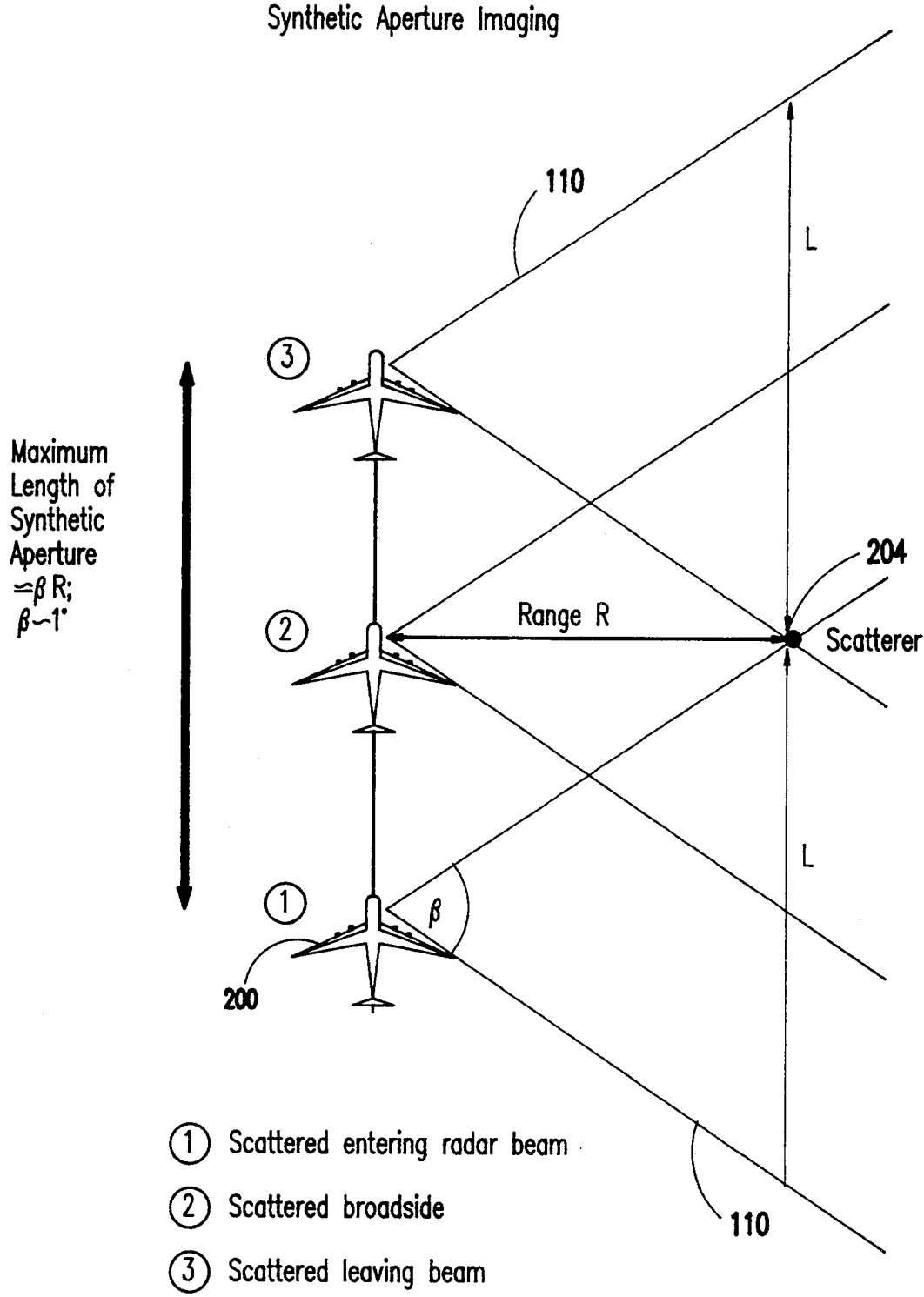
FIG.3A Plan view of SAR showing the maximum length of the synthetic aperture

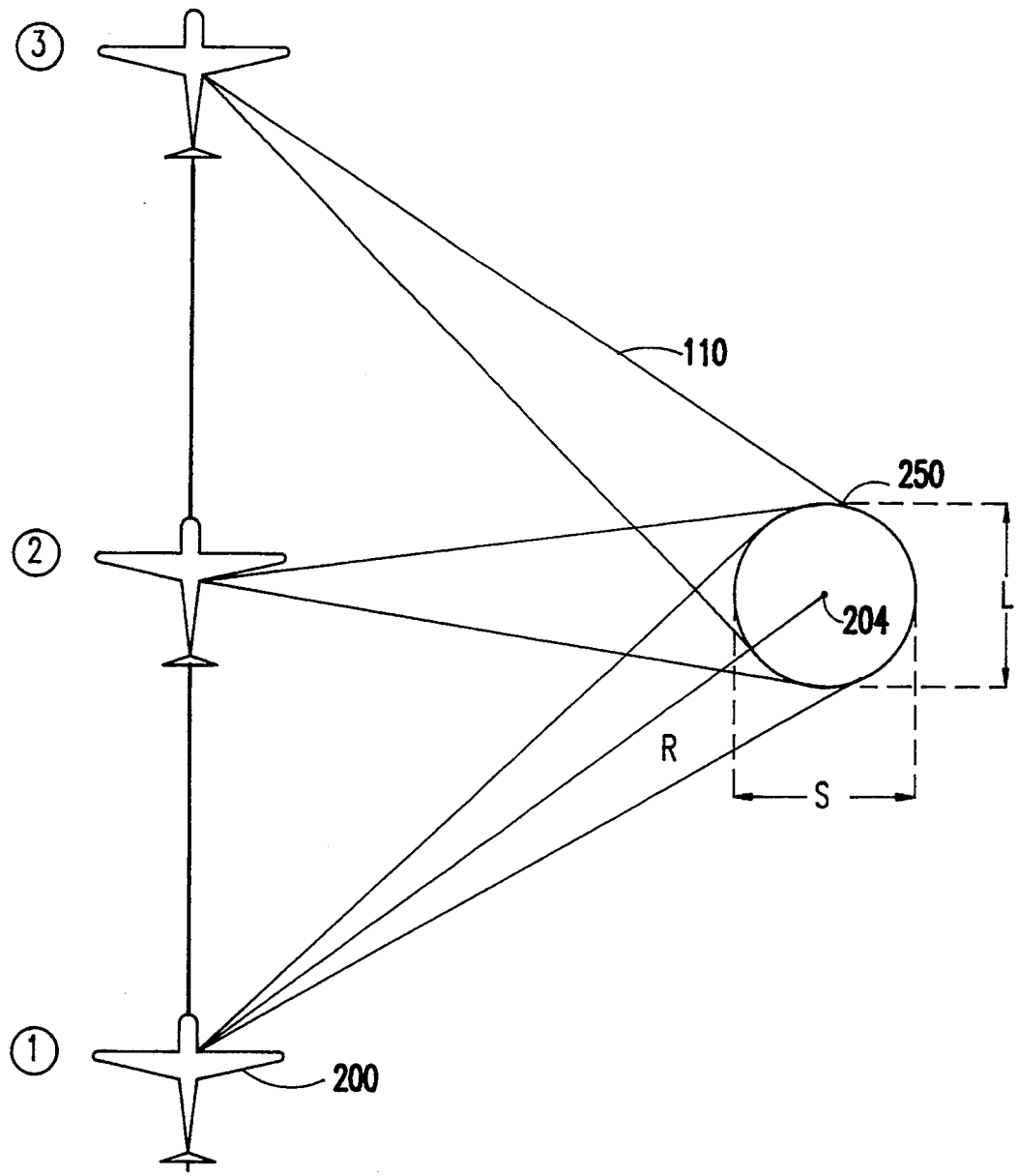
FIG.3B Spotlight Synthetic Aperture Radar

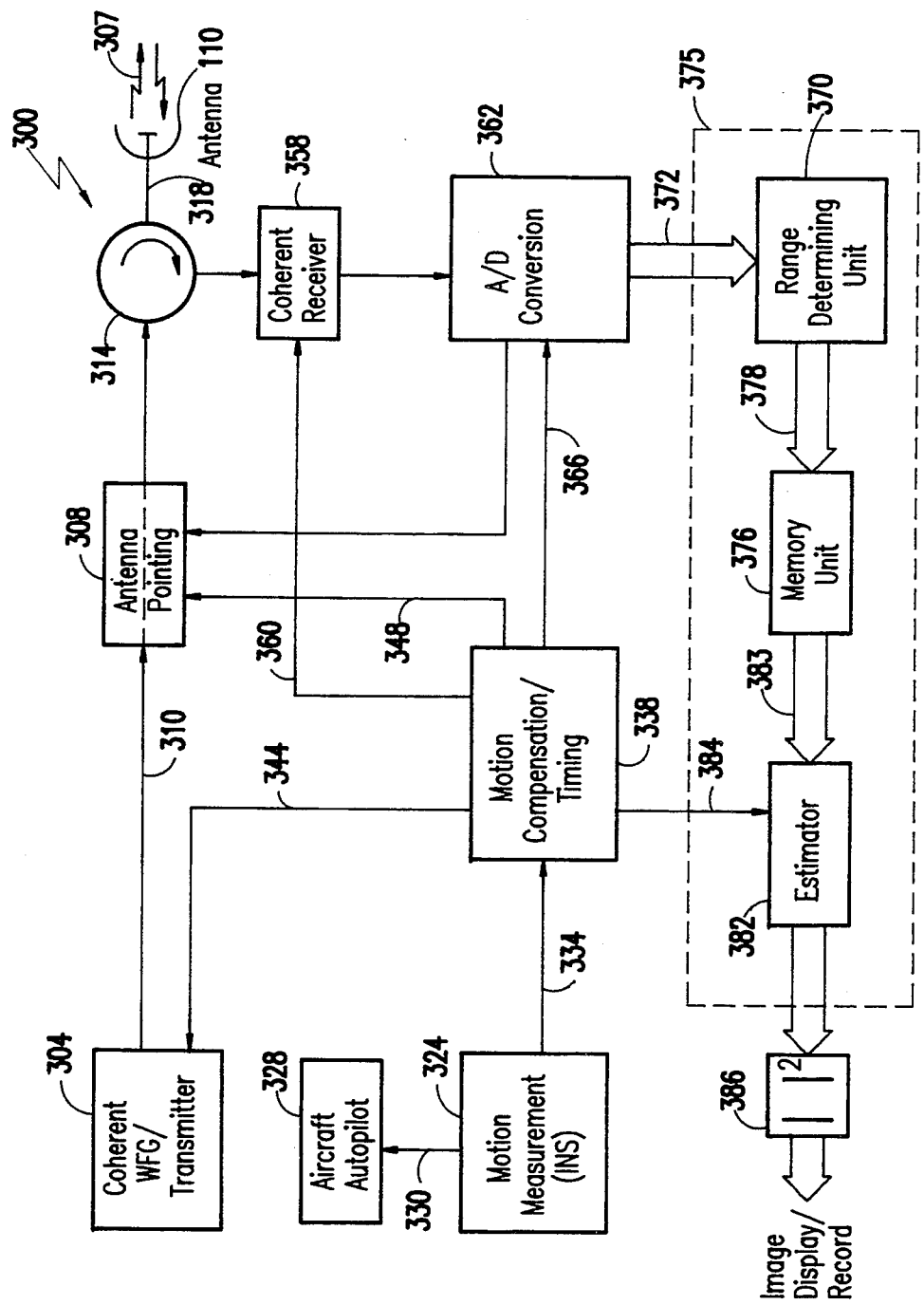
FIG. 4 Typical Stripmap Mode SAR System

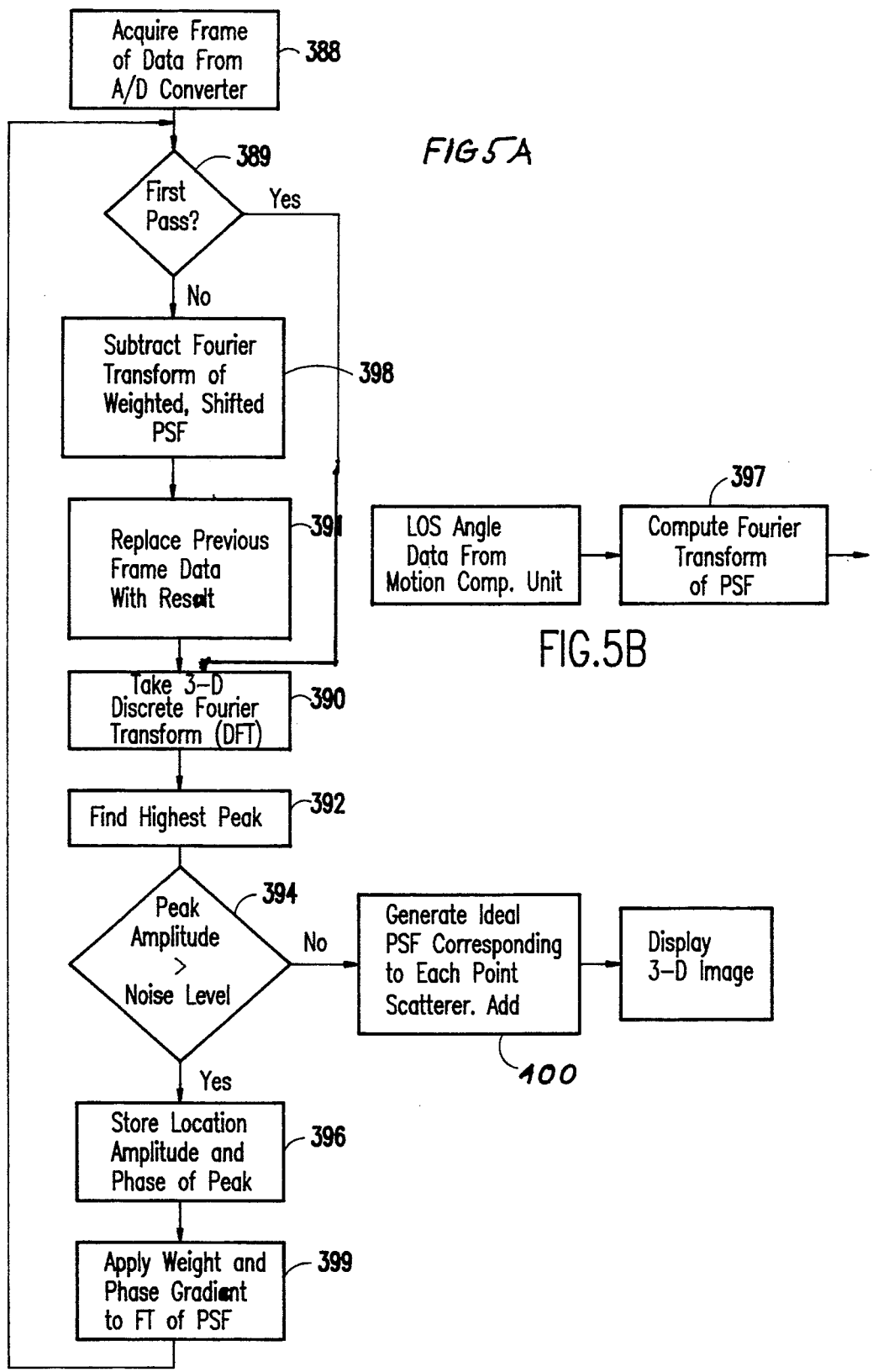

APPARATUS AND METHOD FOR PRODUCING THREE-DIMENSIONAL IMAGES

BACKGROUND OF THE INVENTION

1. Field of the Invention

The present invention generally relates to an apparatus and method for obtaining three-dimensional images and in particular to a synthetic array radar (SAR) capable of obtaining three-dimensional images using aperture elements distributed along a curvilinear path in space without having to position an antenna at all element positions of a filled two-dimensional spatial array.

2. Description of the Prior Art

The use of three-dimensional supplemental information for enhancement of the interpretation of two-dimensional imagery is well recognized in the field of aerial photography. Two broad advantages of a three-dimensional image over a two-dimensional image are apparent. For example, the separability of unwanted clutter from areas where targets are likely to exist may bring about a higher signal to clutter radio. Thus, returns from a tree canopy or those from the ocean surface may be removed or attenuated for better interpretation of the target volume. Secondly, a three-dimensional target signature of a certain resolution cell size contains more information than its two-dimensional counterpart. This promises to be a more effective discriminant for use in a search or identification procedure.

Two-dimensional imaging by aperture synthesis is widely employed using a coherent radar whose transmitting and/or receiving antenna(s) is/are in motion relative to the object whose image is desired. Thus, synthetic aperture radar (SAR) maps of terrain are provided by flying radar platforms along linear paths and recording and processing wideband radar data from time periodic transmitter-receiver element positions. The second "aperture" dimension is provided by varying the radar frequency over a wide bandwidth.

A two-dimensional aperture in this context is an array of points in spatial frequency whose direction and distance from the origin of spatial frequency coordinates are determined by the radar line-of-sight and wavelength respectively ("Quantitative Coherent Imaging: Theory, Methods and Some Applications", by J. M. Blackledge, Academic Press, 1989). Similarly, inverse synthetic aperture radar (ISAR) achieves two-dimensional imaging using wide bandwidth and target rotation about a fixed axis to provide the requisite relative motion as discussed in "Developments in Radar Imaging" by Dale A. Ausherman, et al., IEEE Transactions on Aerospace and Electronic Systems, Vol. AES-20, No. 4, July 1984. The apertures synthesized in these cases are typically "filled," i.e., radar frequencies are uniformly spaced throughout the bandwidth and antenna element positions are uniformly spaced along the radar platform trajectory. The element spacing is set to conform to the Nyquist sampling criterion and element strengths are weighted to control sidelobes of the imaging system point spread function (PSF). Hence, conventional processing employs a two-dimensional Fourier transform of the data array to obtain an image.

The above techniques may in principle be applied to accomplish three-dimensional radar imaging using antenna positioning in a two-dimensional spatial array along with wide radar bandwidth to obtain three "aperture dimensions" as shown in FIG. 1A. The obviously perceived difficulty lies in physically positioning the antenna at all element positions of a filled two-dimensional spatial array. It is impractical, if not impossible, to fly a radar platform so as to sequentially occupy all the element positions of a regular lattice or to have a target object move so as to achieve a similar relative positioning. Also, aperture element positions (and hence PSF's) are not precisely known in most SAR and ISAR imaging applications. As a result, it has been necessary to provide motion compensation (in the form of phase corrections of the radar data) or autofocus (automatic adjustment of element phases to achieve focus) in order to make these systems perform acceptably. (G. A. Bendor and T. W. Gedra, "Single-Pass Fine-Resolution SAR Autofocus," NAECON83, Vol. 1, 1983, pp. 482–488; and Rongquing Xu, Zhidao Cao, and Yongtan Liu, "A New Method of Motion Compensation for ISAR," IEEE International Radar Conf. Proc. 1990, pp. 234–237, the contents of which are incorporated herein by reference).

In spite of all this, it remains desirable to have a three-dimensional processing system which has data compatible with that taken for what are known as two-dimensional spotlight and strip-map mode SAR operation. Moreover, it is desirable to have a three-dimensional system which could be operated in a manner anticipating both modes of operation, i.e. in a two-dimensional mode used for an initial broad area look and in a three-dimensional mode to scrutinize particular regions in that broad area.

SUMMARY OF THE INVENTION

It is therefore an object of the present invention to provide a method and apparatus capable of acquiring three-dimensional images without having to position an antenna at all element positions of a filled two-dimensional spatial array.

Another object of the invention is to provide an apparatus which can be easily switched from a two-dimensional strip-map type synthetic array radar to a three-dimensional synthetic array radar.

Another object of the invention is to provide an apparatus which can be easily switched from a two-dimensional spot light type synthetic array radar to a three-dimensional synthetic array radar.

Another object of the invention is to provide a system and method of obtaining three-dimensional images which can be input to other processes such as visualization or target identification systems.

The primary advantage of the invention is that it can acquire useful three-dimensional radar images using sparse synthetic apertures.

Another advantage of the invention is that it acquires three-dimensional images without having to follow a flight path approximating a raster scan in two dimensions.

Another advantage of the invention is that it can be easily switched from a three-dimensional synthetic array radar to a two-dimensional synthetic array radar and vice versa.

A feature of the invention is that it includes a processor which calculates three-dimensional images using a "CLEAN" algorithm.

Another feature of the invention is that it has an estimator which estimates locations of scatterers.

These and other objects, advantages and features are achieved in accordance with the invention by the provision of a radar system on an aircraft flying in a curvilinear path and having a motion measurement unit which repeatedly measures motion of the aircraft at a plurality of locations on the curvilinear path and outputs motion information, including: a motion compensation and timing unit for receiving the motion information and for outputting a timing signal and a motion compensation signal in accordance with the motion information; a wave transmitter coupled to the motion compensation and timing unit for receiving the timing signal and for repeatedly outputting chirped radar signals synchronized with the timing signal; an antenna coupled to the wave transmitter for transmitting the chirped radar signals and receiving scattered chirped radar return signals, antenna pointing control coupled to the motion compensation and timing unit for receiving the motion information and for outputting antenna pointing commands in accordance with the motion information; an antenna pointing controller for receiving the antenna pointing commands and pointing the antenna in accordance with these antenna pointing commands; a coherent receiver coupled to the motion compensation and timing unit and the antenna for receiving and mixing the scattered chirped radar return signals down to baseband return signals; an analog-to-digital converter coupled to the coherent receiver, the antenna pointing controller and the motion compensation and timing unit for receiving the baseband return signal, the timing signal and the motion compensation signal from the motion compensation and timing unit, digitizing the baseband return signal and outputting digitized return signals; a processor coupled to the analog-to-digital converter, the processor including a range processing unit, a memory and an estimator, the range processing unit outputting range profile values and storing those range profile values in the memory, the estimator estimating three-dimensional image values by back projecting range profiles in directions determined from motion compensation signals supplied by the motion compensational timing unit, determining the location and value of the highest peak in the three-dimensional image and iteratively subtracting a point spread function (main lobe and side lobes) at the location of the said highest peak, until the value of the remaining highest peak is less than system noise level and assigning a clean image point spread function to each of the said highest peaks; and a squaring device for receiving and squaring the image values and outputting them to display a three dimensional image.

The above and other objects, advantages and features of the invention will become more apparent from the following description of embodiments thereof taken in conjunction with the accompanying drawings.

BRIEF DESCRIPTION OF THE DRAWINGS

The foregoing and other objects, aspects and advantages will be better understood from the following detailed description of a preferred embodiment of the invention with reference to the drawings, in which:

FIG. 2 shows the basic geometry of beam projection for a synthetic aperture radar system.

FIGS. 3A and 3B show plan views of a beam transmitted from an antenna (not shown) of a strip-map type SAR and a spotlight type SAR, respectively, on an aircraft travelling along the azimuth direction.

FIG. 4 shows a synthetic array radar (SAR) system according to one embodiment of the invention.

FIGS. 5A and 5B show the steps involved in acquiring three-dimensional images using the SAR system of FIG. 4.

DETAILED DESCRIPTION OF A PREFERRED EMBODIMENT OF THE INVENTION

Figure 1A:
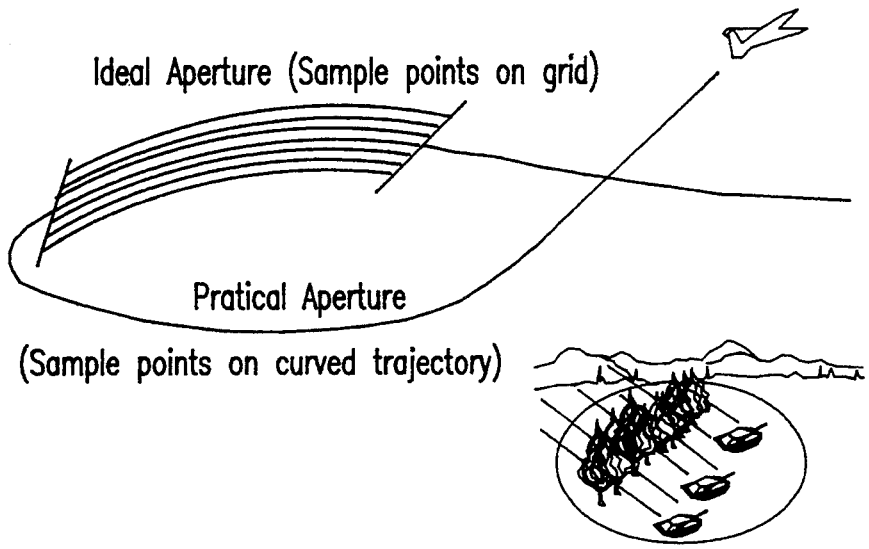
FIG. 1A shows an aircraft traveling a typical two-dimensional path traversed by a radar platform according to the prior art approach and FIG. 1B shows a more practical curvilinear path which can be used to obtain three-dimensional images according to the invention described herein.

Filled apertures, Nyquist element spacing, and apodization (element strength tapering) are not fundamentally necessary to the imaging process. They assure a point spread function (PSF) which is both narrow in extent and has desirably low sidelobes. Response width, however, is inversely proportional to bandwidth extent and a narrow response width does not require a filled band, e.g. two widely spaced elements yield a sinusoidal response, i.e., one with main lobe width determined by band extent but with sidelobes indistinguishable from the "mainlobe." High amplitude sidelobes are the consequence of a sparse or largely unfilled aperture.

Aperture synthesis with sparse apertures has been pioneered in radio astronomy. Therein, aperture elements are associated with interferometric measurements of non-coherent radiation along baselines of different extent and orientation. Because of the high cost and physical size of equipment and impracticality of sequential element measurements, sparse apertures are the rule in radio astronomical imaging.

Radio astronomers have developed a powerful subtractive deconvolution technique, called the CLEAN algorithm, for dealing with the sparse aperture high sidelobe problem. (J.A. Högbom, Astronomy and Astrophysics, Supplement Vol. 15, 1974, pp. 417–426) the contents of which are incorporated herein by reference. Knowing the imaging system PSF (for the sparse aperture) and having a target object appropriately modeled as a collection of point sources, they identify point source responses in their image and subtractively remove them sequentially in descending order of amplitude. The position and amplitude of each peak is stored and a CLEAN image is reconstructed consisting of desirable point spread functions located and scaled in amplitude in accordance with stored values.

The basic subtractive deconvolution scheme has been shown to be applicable in coherent radar imaging as discussed in D. Styerwalt and G. Heidbreder, "On a Bayesian Approach to Coherent Radar Imaging," Eleventh International Workshop on Maximum Entropy and Bayesian Methods in Science and Engineering, Seattle University, Seattle, June 1991, published in *Maximum Entropy and Bayesian Methods*, Kluwer, Dordrecht, 1992; and Jenho Tsao and Bernard D. Steinberg, "Reduction of Sidelobe and Speckle Artifacts in Microwave Imaging: The CLEAN Technique," IEEE Trns. Ant and Prop , Vol 33, April 1988, pp. 543–556), the contents of which are incorporated herein by reference. However, both the image and PSF are complex in the case of coherent imaging and precise knowledge of the PSF is required.

Theory of the Three-Diemsnional Imaging Approach

Three dimensional coherent imaging is in principle achievable from data obtained when a radar is sequentially positioned along a curvilinear path in space. The spatial extent $L_o$ of this path in each of two orthogonal directions must be at least:

$$L_o \geq \frac{\lambda R}{2r_o} \qquad (1)$$

where R is the range of the target, $\lambda$ is the wavelength and $r_o$ is the desired resolution.

Figure 1B:
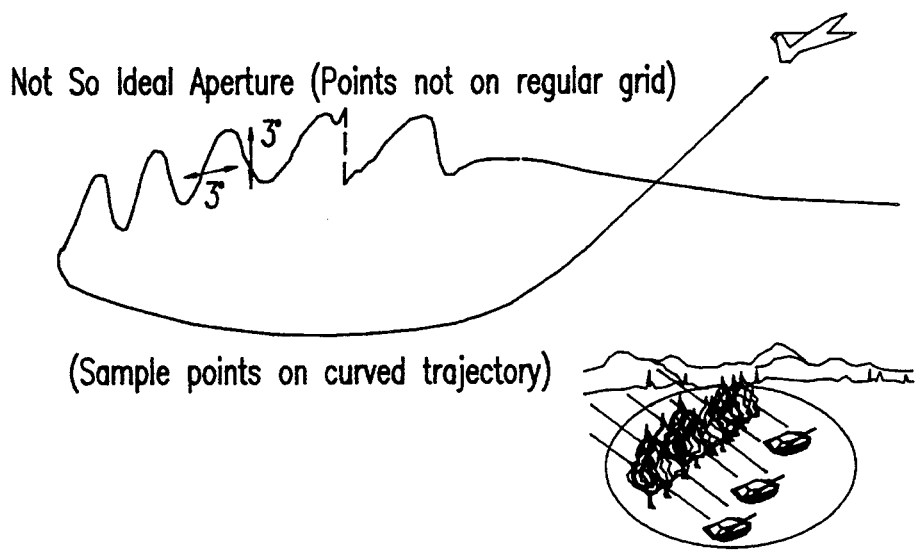

The curvilinear path traversed by the radar platform will not reach all the Nyquist spaced points of a two-dimensional planar lattice (FIG. 1B). Hence the three-dimensional "aperture" will be sparsely filled. To illustrate this result, its effects, and how the technique disclosed herein deals with them we consider a target modelled as a collection of point scattering centers and described in a target fixed Cartesian coordinate system. The radar is on a platform which is moving relative to the target and periodically at a high rate measures the target's frequency response (the Fourier transform of a range profile).

A frequency response may be obtained by stepped frequency measurements or by measurements with a linearly frequency modulated (chirp) pulse. The frequency response may be obtained in a time so short that the relative motion between target and radar during the measurement time can be neglected (but not during the time interval between frequency response measurements). Let the index i denote a particular frequency response. Let its samples be denoted by the index k and let its radar line-of-sight (LOS) direction as measured from the target center of coordinates to the radar phase center be denoted by the unit vector $a_i$. Then a radar datum may be indicated by:

$$D_{ik} = \sum_n g(s_n) \exp\left\{ -j\frac{4\pi}{\lambda_k} a_i \cdot (s_n + a_i R_{ik}) \right\} \qquad (3)$$

where $\lambda_k$ is a sample wavelength, $R_{ik}$ is the distance from the center of coordinates to the radar phase center, $s_n$ is the position of the $n_{th}$ target scattering center and $g(s_n)$ is its strength (in general a complex quantity).

It is important to note that, in the context of this target model, imaging consists of estimating the quantities $s_n$ and $g(s_n)$, i.e., the locations and strengths of scattering centers. The conventional reconstruction produces a function $g(s)$ by a two step process. First, the values $R_{ik}$ are estimated and a phase correction $4\pi R_{ik}/\lambda_k$ is applied to each datum to yield:

$$D_{ik} = \sum_n g(s_n) \exp\left\{ -j\frac{4\pi}{\lambda_k} a_i \cdot s_n \right\} \qquad (3)$$

Then an image is obtained as:

$$\hat{g}(s) = M^{-1}N^{-1} \sum_i \sum_k D_{ik} \exp\left\{ j\frac{4\pi}{\lambda_k} a_i \cdot s \right\} = \qquad (4)$$

$$M^{-1}N^{-1} \sum_i \sum_k \sum_n g(s_n) \exp\left\{ j\frac{4\pi}{\lambda_k} a_i \cdot (s - s_n) \right\}$$

i.e. by a Fourier transformation where M and N are the numbers of frequency responses and frequency samples respectively.

The wavelengths $\lambda_k$ are known, but the $a_i$ must either be measured simultaneously with the data, or estimated from it. The summation in Equation (4) may be viewed as the coherent sum of PSFs weighted by $g(s_n)$ and centered at $s_n$. The PSF is then $$PSF = M^{-1}N^{-1} \sum_i \sum_k \exp\left( j\frac{4\pi}{\lambda_k} a_i \cdot s \right) \qquad (5)$$

The PSF is exclusively a function of aperture element location (and possibly weights). Weighing coefficients $W_{ik}$ ordinarily employed to reduce sidelobes, are omitted in Equation (5) or rather by omission they are set to unity.

If the spatial frequencies $2/\lambda_k$ are uniformly spaced, and if the $a_i$ fill a uniformly spaced array of angular positions, Equation (5) will exhibit very nearly a sin(Nx)/sin(x) variation in each of three dimensions. In this case, tapered weights $W_{ik}$ would achieve acceptably low sidelobes in the PSF with a taper dependent resolution loss by generally less than a factor of two. In the case considered here, however, the sparseness of the $a_i$ preclude achievement of a sharp PSF with low sidelobes in all three dimensions. Aperture extent assures sharpness but sparseness results in very high (by usual standards) sidelobes in two dimensions FIG. 2 shows two-dimensional cross sections of the three-dimensional point response of a circular aperture resulting when the SAR carrying aircraft flies a circular path around and directly above the target point.

The three-dimensional imaging technique described herein treats the Fourier transformation of Equation (4) not as producing the desired image, but rather as a vehicle for estimating the $s_n$ and the $g(s_n)$. The problem with Equation (4) in the sparse aperture case is that some of the peaks it produces in the reconstruction are not associated with the location of a point scattering center (a scatterer). Rather, they may be sidelobe peaks of stronger scatterers at other locations. But it is almost certain that the highest peak of an image using Equation (4) in the sparse aperture case is at the location of the strongest scattering center. (D. Styerwalt and G. Heidbreder, "On a Bayesian Approach to Coherent Radar Imaging," Eleventh International Workshop on Maximum Entropy and Bayesian Methods in Science and Engineering, Seattle University, Seattle, June 1991, published in *Maximum Entropy and Bayesian Methods*, Kluwer, Dordrecht, 1992). Hence, measurement of $s_i$ and $g(s_i)$ at the highest peak allows for essential removal from the (complex) image of the strongest scatterer by subtraction of:

$$M^{-1}N^{-1} g(s_n) \sum_i \sum_k \exp\left( j\frac{4\pi}{\lambda_k} a_i \cdot (s - s_n) \right) \qquad (6)$$

from the data image (Equation (4)).

This removal is incomplete due to inaccuracy in measuring $s_n$ and $g(s_n)$ but will be sufficient to reduce the scatterer's sidelobes so as to reveal the position and strength of the second strongest scatterer. Continuing in this way it is possible to estimate positions and strengths of all scattering centers with amplitudes above system noise level. The image information resides in the location and strengths of these scattering centers and in the known system resolution as determined by the extent of the mainlobe of the system PSF response. Each scattering center may be associated with a point spread function having mainlobe width and no sidelobes in a "CLEAN" image. This "CLEAN" image describes a target model consisting of point scatterers whose location and strengths are such as would provide data closely fitting the actual data. At each step of the process a least squares fit of a shifted, strength adjusted PSF to the image is achieved: the fit is always to the highest peak and is achieved simply by the Fourier transform. The highest Fourier transform image peak always indicates the scatterer achieving this fit. Subject to the assumption that at most one scattering center occupies any diffraction limited resolution cell, the resulting image is essentially a maximum likelihood image, i.e. it yields essentially maximum likelihood estimates of point scatterer positions and strengths.

The "cleaning" of sidelobes from an image, as described above, requires knowledge of the system PSF, i.e. Equation (5). The LOS directions (the $a_i$ in (4)) are unknown and must be determined from the data or from auxiliary motion compensation information. Current SAR practice incorporates motion compensation and/or autofocus techniques. The values of the $a_i$ which properly focus the "dirty" high sidelobe image are the same $a_i$ which focus the "CLEAN" image. Hence, focusing, which must be the first step in the imaging process, is independent of the sidelobe removal process.

The PSF (Equation (5)) is ideal in the sense that it is aperture dependent but scatterer independent. In practice, responses seen in the Fourier transform image will not be due to ideal omni-directional point scatterers. Nevertheless, the target model developed can be expected to exhibit recognizable target properties such as its general physical configuration. It constitutes a potentially useful target signature for many applications of imaging.

The character of the PSF for data on apertures exhibiting significant deviations from planarity is fundamental to this three-dimensional imaging process. In contrast to numerous practical situations where small amounts of curvature enter as imperfections on otherwise perfectly planar distributions, the preferred operation here is on data subsets where the deviation from any plane is considerable in comparison with the extent projected onto the plane. Such data sets can be generated by an airborne SAR platform flying a highly curved aperture path or in ISAR by a ship target rolling severely while plying a circular course.

Implementation of the Three-Dimensional Imaging Technique

FIG. 4 shows the basic geometry of synthetic aperture radar. An antenna 100 on an aircraft (not shown) flying in the azimuth direction (y direction) outputs a radar beam 110 which makes a radar footprint 114 on ground. Antenna 100 is at an altitude A from the ground and at a range R (x direction) from footprint 114. Footprint 114 has a beam width L (at a center point CP. of footprint 114) in the y direction and a swath S (also at point CP) in the x direction. The range R is the distance from antenna 100 to point CP and the range R' is the distance of a projected point P (i.e., a point projected from antenna 100 straight to the ground) from the center point CP.

FIG. 3A shows a plan view of beam 110 transmitted from an antenna (not shown) of a strip-map type SAR on an aircraft 200 travelling along the azimuth direction. In particular, FIG. 3A shows aircraft 200 with beam 110 as scatterer 204: 1) enters a footprint of width L (corresponding to L of FIG. 2); 2) is broadside of the footprint; and 3) leaves the footprint.

FIG. 3B shows a plan view of beam 110 transmitted from an antenna (not shown) of a spotlight type SAR on an aircraft 200 travelling along the azimuth direction. In particular, FIG. 3B shows aircraft 200 with beam 110 at three locations 1), 2), and 3). In this case, the SAR must continually adjust the position of its antenna so that the same spot 250 is illuminated when aircraft 200 is at positions 1), 2), 3).

Radar beam 110 is typically linearly frequency modulated (FM) (chirped) to obtain range R, but can also be frequency stepped. The spectrum of the FM chirp can be obtained by using a surface acoustic wave (SAW) device which is matched to the FM chirped signal received by antenna 100 using standard pulse compression techniques. The azimuth values are acquired using standard three-dimensional SAR and ISAR techniques as discussed in "Quantitative Coherent Imaging: Theory, Methods and Some Applications", by J. M. Blackledge, Academic Press, 1989, and "High Resolution Radar Imaging", by Dean L. Mansa, 1984, the contents of both of these references being incorporated herein by reference.

FIG. 4 shows an embodiment of a synthetic array radar (SAR) system 300 mounted on an aircraft (not shown) which can operate as a two-dimensional SAR (ISAR) or as a three-dimensional SAR according to this invention. In particular, FIG. 4 shows a coherent waveform generator (WFG) transmitter 304 which outputs a wideband FM chirped signal for periodic transmission at a pulse repetition frequency (PRF). Antenna 110 receives the FM chirped signal from WFG transmitter 304 via line 310 and outputs a radar beam 307 corresponding to beam 110 of FIG. 2. Antenna pointing control 308 is based on signals from the motion compensation/timing unit 338. These pointing signals effect slight adjustment of the pointing direction of antenna 110 thereby compensating for angular excursions made by the aircraft on which SAR system 300 is mounted. This increases the dwell time and improves the signal-to-noise (SNR) and resolution of resulting images. An aircraft inertial navigation system (INS) 324 (a motion measurement unit) calculates and sends steering commands to aircraft autopilot 328 via line 330. INS 324 also sends position measurement signals via line 334 to the motion compensation/timing unit 338 which provides a system clock for SAR system 300. In particular, motion compensation/timing unit 338 sends timing signals to WFG transmitter 304 and antenna pointing control 308 via lines 344 and 348, respectively.

A return radar signal is received by antenna 110. The return radar signal is demodulated to a base band signal by coherent receiver 358. This demodulation process is aided by a motion compensation signal sent from motion compensation/timing unit 338 to coherent receiver 358 via line 360. An analog-to-digital (A/D) converter 362 converts the analog baseband signal to a digital baseband signal and outputs that digital signal to a processor 375. Processor 375 is coupled to motion compensation/timing unit 338 via line 366. Processor 375 includes a range processing unit 370 such as a digital processor matched to the FM chirp, a memory unit 376 coupled to range processing unit 370 via bus 378 and an estimator 382 coupled to memory unit 376 via bus 383.

Range processing unit 370 calculates the range profiles (see FIG. 2) and outputs them to memory unit 376 via bus 378 for storage. Estimator 382 can be a high speed microprocessor which receives timing signals via line 384. In the two-dimensional mode, estimator 382 operates as an azimuth processor as discussed in "Quantitative Coherent Imaging: Theory, Methods and Some Applications", by J. M. Blackledge, Academic Press, 1989. In the three-dimensional mode, estimator 382 determines the locations and amplitudes of scatterers using an estimation process based on the above discussed CLEAN method as will be explained below. Finally, a squaring device 386 receives the complex amplitudes and squares those amplitudes to yield the intensity at each image position. FIGS. 5A and 5B show the steps involved in acquiring a three-dimensional image using a SAR system. In particular, processor 375 receives the digitized return signals from A/D converter 362 at step 388. At decision block 389, a decision is made as to whether or not this is the first pass for this data frame. If it is the first pass, processor 375 Fourier transforms the digitized return signals at step 390 to yield range profiles which are back projected to thereby effect a three-dimensional DFT in order to obtain three-dimensional image data.

Estimator 382 determines the location and value of the highest peak in the Fourier transformed digital data at step 392 and then compares the value of the highest peak with a known system noise level at step 394. If the value of the highest peak is determined to be greater than the noise level, estimator 382 stores the value and location of that peak in memory unit 376 at step 396.

As illustrated in FIG. 5B, line-of-sight data from motion compensation unit 338 is used to compute the point spread function (PSF) Fourier transform at step 397. A weight and phase gradient is applied to the Fourier transform of the PSF in step 399 and estimator 382 then subtracts at step 398 the Fourier transform of a point spread function previously computed in step 397 (PSF in Equation (5)) at the location of that peak from the Fourier transformed digital data to yield modified Fourier transformed digital data. Estimator 382 replaces the previous frame data input to step 398 at step 391 with the result of the subtraction in step 398 and proceeds to step 390. Steps 390–398 are repeated until the value of the highest remaining peak is determined to be equal or less than the system noise level at step 394 at which estimator 382 generates ideal point spread functions at each peak location weighted by the corresponding amplitudes and phases, adds these point responses coherently to create a "CLEAN" image which it outputs to squaring device 386 at step 400.

Finally, as discussed above, SAR system 300 can be easily converted to a standard two-dimensional SAR system by replacing estimator 382 with an azimuth processor which operates like a standard azimuth processor in a two-dimensional SAR system as described in "Quantitative Coherent Imaging: Theory, Methods and Some Applications", by J. M. Blackledge, Academic Press, 1989, which was incorporated herein by reference. In practice, this conversion involves changing how data is processed, i.e., the same equipment can be used in both cases.

Numerous and additional modifications and variations of the present invention are possible in light of the above teachings. It is therefore to be understood that within the scope of the appended claims, the invention may be practiced otherwise than as specifically claimed.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A system for generating three-dimensional radar image data from radar target return signals generated by aperture elements of a synthetic aperture radar on a vehicle moving along a path that is curvilinear with respect to said target, which system discriminates against spurious responses associated with the sparseness of the synthetic array, comprising in combination;
   means for generating line of sight angle values from said curvilinear path to said target;
   processor means for:
   a) generating phase and amplitude values of scattering points from said radar return signals by Fourier transforming said radar return signals from said target to generate three-dimensional image data and identifying a highest peak of said three-dimensional image data as a scattering point of said target;
   b) subtracting a Fourier transform of a weighted, shifted point spread function based on said line of sight angle values and element weights from said radar returned digital data to yield, as a result of said subtraction process, modified digital data; and
   c) iteratively identifying highest peaks of three-dimensional image data as scattering points of said target; and
   d) subtracting a Fourier transform of a weighted, shifted point spread function from said modified digital data to yield estimated scattering element positions and strengths from target scattering points in three dimensions.

2. A method for generating three-dimensional radar image data from radar target return signals generated by aperture elements of a synthetic aperture radar on a vehicle moving along a path that is curvilinear with respect to said target, which method discriminates against the spurious responses associated with the sparseness of the synthetic array, comprising the steps of;
   generating line of sight angle values from said curvilinear path to said target;
   generating phase and amplitude values of scattering points from said radar return signals by Fourier transforming said radar return signals from said target to generate three-dimensional image data;
   identifying highest peaks of three-dimensional image data as scattering points of said target;
   subtracting a Fourier transform of a weighted, shifted point spread function based on said line of sight angle values and element weights from radar returned digital data to yield, as a result of said subtraction process, modified digital data; and
   iteratively identifying highest peaks of three-dimensional image data as scattering points of said target; and
   subtracting a Fourier transform of a weighted, shifted point spread function from said modified digital data to yield estimated scattering element positions and strengths from target scattering points in three dimensions.

3. A system for generating three-dimensional radar image data from radar target return signals generated by aperture elements of a synthetic aperture radar on a vehicle moving along a path that is curvilinear with respect to said target, which system discriminates against spurious responses associated with the sparseness of the synthetic array, comprising in combination;

motion compensation and timing unit for receiving the motion information and for outputting a timing signal and a motion compensation signal in accordance with said motion information;

a wave transmitter coupled to said motion compensation and timing unit for receiving said timing signal and for repeatedly outputting chirped radar signals synchronized with said timing signal;

an antenna coupled to said wave transmitter for transmitting said chirped radar signals and receiving scattered chirped radar return signals as a result of said chirped radar signals;

antenna pointing controller coupled to said motion compensation and timing unit for receiving the motion information and for outputting antenna pointing commands in accordance with the motion information;

an antenna pointer connected to said antenna and coupled to said antenna pointing controller for receiving said antenna pointing commands and pointing said antenna in accordance with said pointing commands;

coherent receiver coupled to said motion compensation and timing unit and said antenna for receiving and mixing said scattered chirped radar return signals down to baseband return signals;

analog-to-digital converter coupled to said coherent receiver, said antenna pointing controller and said motion compensation and timing unit for receiving said baseband return signal, said timing signal and said motion compensation signal from said motion compensation and timing unit, digitizing said baseband return signal and outputting digitized return signals;

processor means for:
 a) generating phase and amplitude values of scattering points from said radar return signals by Fourier transforming said radar return signals from said target to generate three-dimensional image data and identifying a highest peak of said three-dimensional image data as a scattering point of said target;
 b) subtracting a Fourier transform of a weighted, shifted point spread function based on said line of sight angle values and element weights from said radar returned digital data to yield, as a result of said subtraction process, modified digital data;
 c) iteratively identifying highest peaks of three-dimensional image data as scattering points of said target; and
 d) subtracting a Fourier transform of a weighted, shifted point spread function from said modified digital data to yield estimated scattering element positions and strengths from target scattering points in three dimensions; and squaring device for receiving and three dimensional image values and outputting display data which can be used to display a three dimensional image.

* * * * *